United States Patent

[11] 3,581,587

[72] Inventor Frank Dickenbrock
    Warren, Mich.
[21] Appl. No. 822,121
[22] Filed May 6, 1969
[45] Patented June 1, 1971
[73] Assignee General Motors Corporation
    Detroit, Mich.

[54] TRANSMISSION
    8 Claims, 7 Drawing Figs.
[52] U.S. Cl. .................................................. 74/200
[51] Int. Cl. ............................................... F16h 15/38
[50] Field of Search ........................................ 74/190.5, 200

[56] References Cited
    UNITED STATES PATENTS
    2,959,973  11/1960  Madson ..................... 74/200
    3,410,146  11/1968  Nordeen .................... 74/200
    OTHER REFERENCES
    German Printed Application No. 1,007,590; 5/57; Kraus; 74/200

Primary Examiner—Leonard H. Gerin
Attorneys—Warren E. Finken, A. M. Heiter and John P. Moran ABSTRACT: A toroidal friction roller-type transmission including a housing, input and output shafts rotatably mounted therein, input and output toroidal-shaped races secured to the input and output shafts, respectively, a plurality of rollers frictionally mounted between the races, a ring-type support member maintained in a nonrotating position in the housing, a ratio collar rotatably mounted in a track formed in the inside surface of the ring member, a plurality of cam grooves formed on an angle in the ratio control collar, means for rotating the control collar in the track, a central hub portion rotatably mounted on one of the shafts and secured to the ring member by spokes extending therebetween and alternately spaced with respect to the rollers, radial openings formed in the hub portion, a mast secured in each of the radial openings and extending radially outward into a center opening formed in each roller, a carrier rotatably supported on bearings in the center opening and pivotably connected to the extended end of the mast, pin means for limiting the amount of inclination of the carrier on the mast, an extension formed on the carrier and extending radially outward into the angled cam grooves such that any rotary movement of the control collar will initially incline the carrier extensions, the carriers, and the rollers about the axes through the points of contact between the rollers and the races, thereby creating large tractive forces which will cause the rollers to tilt in a plane perpendicular to inclined planes of the rollers until the inclination returns to zero.

PATENTED JUN 1 1971

INVENTOR.
Frank Dickenbrock
BY
John P. Moran
ATTORNEY

INVENTOR.
Frank Dickenbrock
BY
John P. Moran
ATTORNEY

TRANSMISSION

This invention relates to automotive transmissions and, more particularly, to friction roller-type transmissions.

This invention is an improved toric transmission of the type disclosed in applicant's U.S. Pat. No. 3,394,617, issued on July 30, 1968.

A general object of the invention is to provide an improved toric roller assembly wherein a small force is able to incline the roller portion thereof and result in an automatic large tractive force at the rollers' edges which accomplishes the desired tilt of the rollers along toric paths formed on input and output races, producing a desired input/output speed ratio.

Another object of the invention is to provide an improved toric roller assembly, wherein reaction torques automatically urge the rollers toward a lower output/input speed ratio, rather than toward an increasing speed ratio. In other words, the structural components are relatively simple in configuration and, at the same time, are such that there is no need for holding extremely close manufacturing tolerances, there being included a predetermined self-compensating characteristic to cope with tilt errors due to a buildup of tolerances or any discrepancies therein.

Other objects and advantages of the invention will become apparent when reference is made to the following specification and accompanying drawings wherein.

Figure 1:
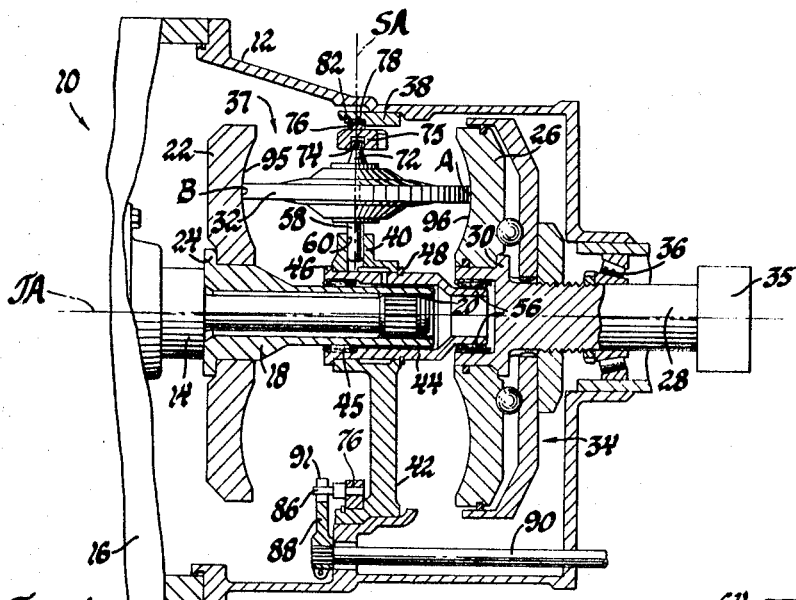
FIG. 1 is a cross-sectional view of a toric transmission embodying the invention.

Referring now to the drawings in greater detail, FIG. 1 illustrates a toric roller-type, continuously variable speed ratio mechanism 10, assembled in a case or housing 12. An output shaft 14 extends into the housing 12 from a prime mover, such as a gas turbine engine or other drive train component, represented generally at 16. A transmission input shaft 18 is secured by splines 20 to the shaft 14.

The toric roller mechanism 10 includes a driving or input race 22 which is secured on the transmission input shaft 18 adjacent a collar 24 formed on the leftmost end thereof, and a driven or output race 26 which is secured to an output or power delivery shaft 28 against a collar 30 formed adjacent the inner end thereof. The collar 30 is oppositely disposed from the input shaft collar 24 so that the races 22 and 26 will be retained in contact with opposing edges of a plurality of rollers 32 (FIG. 4) which are rotatably confined therebetween. If desired, any suitable axial-loading device 34, such as that illustrated and described in the applicant's U.S. Pat. No. 3,394,614, issued on July 30, 1968, may be used to place an axial thrust on the rollers 32 and races 22 and 26 in order to maintain the rollers in nonslipping frictional contact with the driving and driven races.

Before describing the means by which the rollers 32 are tilted in order to achieve the continuously variable input-to-output speed ratios, it may be noted at this point that the power flow through the system is as follows:

The prime mover 16 will rotate the output shaft 14. The shaft 14 will, in turn, rotate the transmission input shaft 18 and its associated input race 22. Rotation of the race 22 about the axis of the shafts 14 and 18 or toric axis "TA" will contact at point "B" and rotate the adjacent rollers 32 through contact point "B," about the transverse or spin axes "SA" through their respective centers perpendicular to the plane of the contact perimeter. The rollers 32 will, in turn, contact at point "A" and rotate the output race 26. The rotary speed of the output race 26 will be determined by the tilt position of the rollers 32. For instance, if the rollers 32 are tilted such that their input points "B" are angled downwardly in FIG. 1, approaching the shaft 18, the resultant speed of the output race 26 will be lower, the input/output speed ratio is higher, i.e., 3:1, than the 1:1 ratio illustrated. The rotary speed of the output race 26 is transmitted to the transmission output shaft 28 to which it is secured and, thence, to any desired driven device, represented generally at 35. The transmission output shaft 28 is rotatably supported on bearings 36 mounted in an opening formed in the housing 12.

Figure 3:
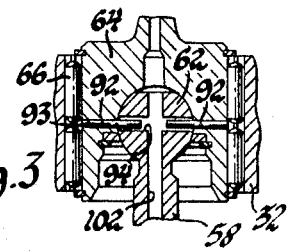
FIG. 3 is a fragmentary cross-sectional view of a portion of FIG. 2, taken along the plane of line 3-3, and looking in the direction of the arrows.
Figure 4:
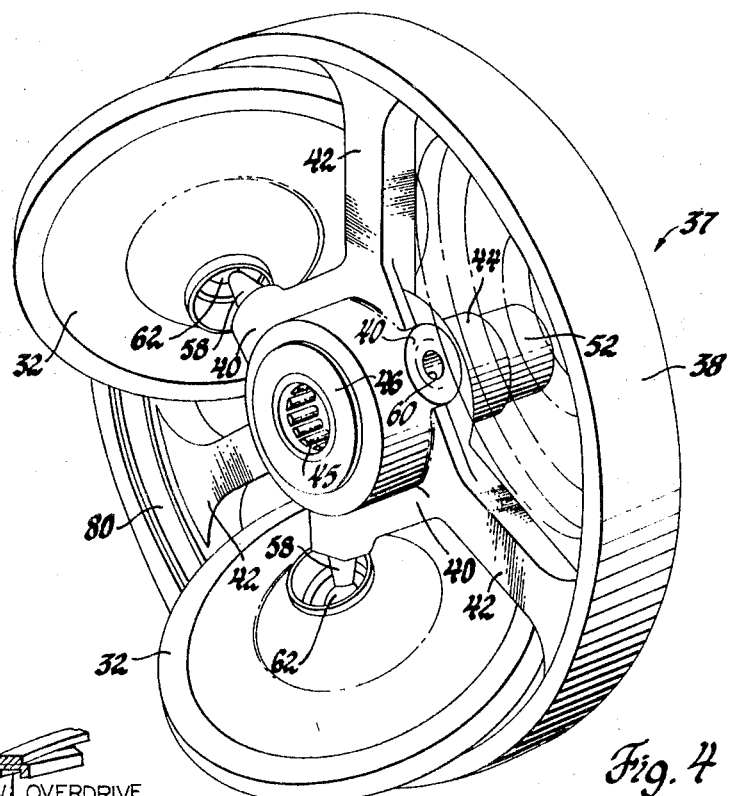
FIGS. 4 and 5 are enlarged perspective views of portions of FIG. 1.

Considering now the means which supports and tilts the rollers 32, each roller 32 is a part of an assembly which includes a support or spider member 37 (FIG. 4). An outer ring 38 of the member 37 may be secured to the housing 12 or may be mounted by splines to prevent relative rotation but permit small axial slidable movement therein to equalize loading. A central hub portion 40 is secured to the outer ring 38 by means of three spoke members 42 (FIG. 4), the spoke members 42 being located alternately with the rollers 32. A cylindrical member 44 is mounted around the transmission input shaft 18 on bearings 45, and press-fitted into the hub portion 40. The member 44 is restrained from axial movement by a collar 46 formed on an end of the member 44 and a retaining ring 48 (FIG. 2) mounted in a groove 50 formed in the outer surface of the member 44. The member 44 includes an extension 52 which extends into a counterbore 54 formed in the inner end of the output shaft 28 and is rotatably supported therein on needle bearings 56. A support mast 58 is press-fitted in each of three radial openings 60 formed in the central hub member 40 and has a ball-shaped pivot 62 at the end thereof which extends into the center of each of the rollers 32. A carrier 64 is universally pivotally mounted at a point "P" on the support or mast by a socket which engages the ball-shaped pivot 62. The carrier 64 also has a cylindrical bearing 66 located in an axial opening 68 formed in each of the rollers 32 to rotatably support the rollers 32. Retaining rings 70, located adjacent the outer faces of the rollers 32, hold the needle bearings 66 in axial position but permit relative axial movement of the roller on the carrier for proper tracking and load equalization. Each carrier 64 includes a control cam extension 72 which extends radially outwardly therefrom into one of a plurality of grooves 74 formed in a cam member 75 fixed to a ratio control collar 76. The ratio control collar 76 is rotatably mounted about toric axis "TA" on needle bearings 78 in an annular groove 80 (FIG. 3) formed on the inside surface of the outer ring 38, the collar 76 being axially located therein by means of a retaining ring 82 mounted in a groove 84 formed in the ring 38.

Figure 5:
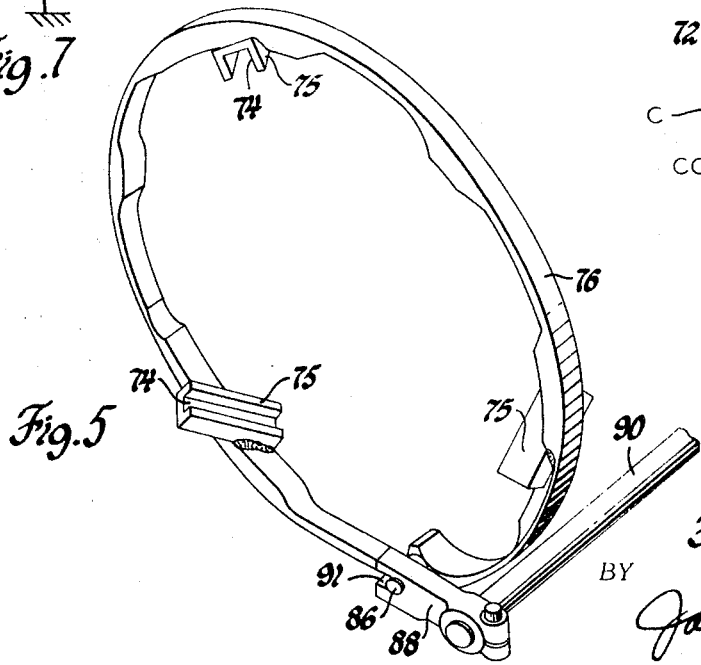

Referring now to FIG. 5, it may be noted that the slot or grooves 74 in cam member 75 are angularly disposed relative to the collar 76 and toric axis. It may be further noted that a pin member 86 is secured to the collar 76, extending axially outwardly therefrom. A crankarm member 88 is formed on the end of a shaft 90. The crankarm member 88 includes a slot 91 formed therein into which the pin member 86 extends. Any suitable manual or hydraulic means may be employed to rotate the shaft 90 or member 88, such as the hydromechanical system described and illustrated in U.S. Pat. application Ser. No. 822,122, filed May 6, 1969 in the names of Milton H. Scheiter and Frank Dickenbrock.

A predetermined maximum rotation of the collar 76 is determined by the fit of a pair of pins 92 mounted in axially aligned openings 93 and 94 formed in each carrier 64 and each ball-shaped pivot 62. The openings 94 permit a predetermined movement or inclination of the carrier relative to the ball-end 62. The pins 92 also prevent the carrier 64 from spinning and wearing out its extended end 72, and, additionally, channel lubricating oil to the bearings 66.

Figure 2:
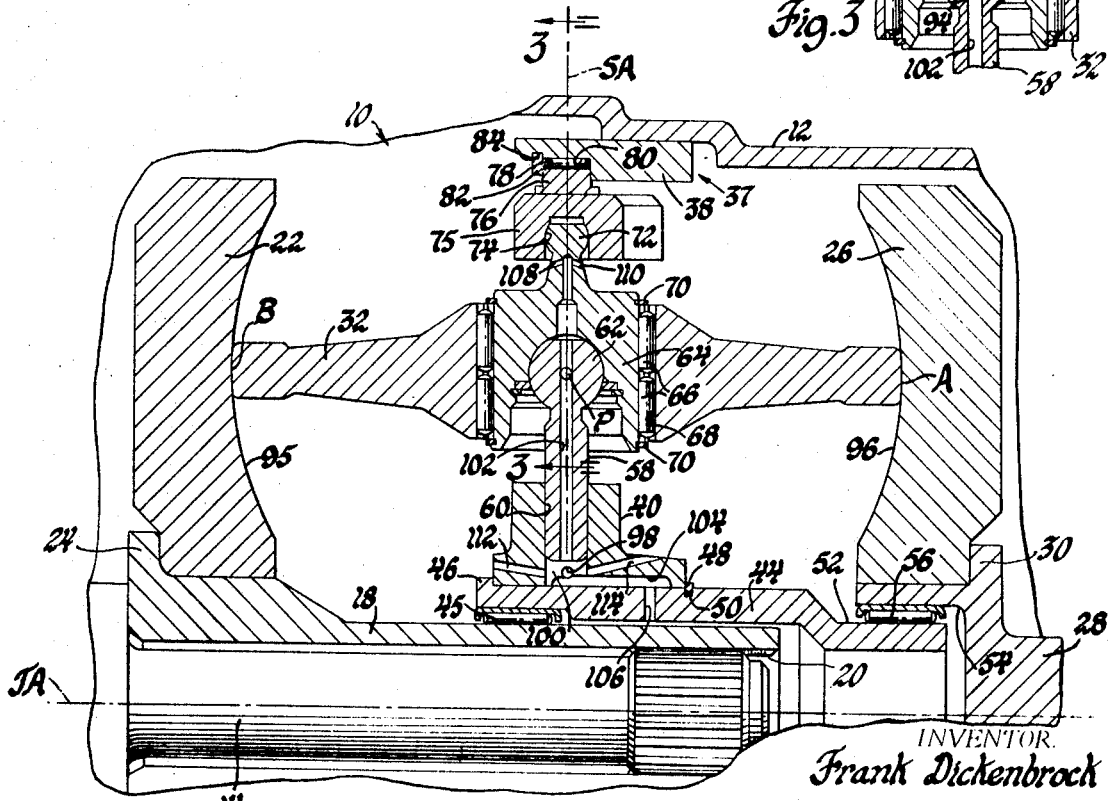
FIG. 2 is an enlarged cross-sectional view of a portion of FIG. 1.

In all roller positions the pivot point "P" is in the plane of the contact perimeter at the intersection with the spin axis "SA" and inclination axis "AB," In the 1:1 unchanging ratio drive position shown in FIGS. 1 and 2, the spin axis "SA"

coincides with the axis of support mast 58, the universal pivot point "P," the axis of cylindrical bearing 66 and the control cam extension 72, and radially intersects the toric axis "TA." In all unchanging ratio drive positions, the spin axis "SA" intersects the inclination axis "AB" at the universal pivot point "P," coincides with the axis of the cylindrical bearing 66 and the control cam extension 72 is in a plane radial to the toric axis and intersects the toric axis "TA." This is the position of zero angle of inclination and an angle of tilt of spin axis of the rollers providing the ratio drive.

Considering now a changing condition, rotation of the crankarm member 88 will act upon the pin 86, located in the slot 91 formed in the member 88, to rotate the control collar 76, within the limit permitted by the pins 92. Since the slots 74 (FIG. 5) are angularly disposed on the inner surfaces of the control collar 76, it may be realized that, with the rollers in the 1:1 ratio position, the initial rotation of the slots 74 will cause the control cam extensions 72 of the roller carriers 64 or the spin axis "SA" to incline in a plane parallel to the planes of the input and output races, 22 and 26. The rollers 32 will likewise be initially inclined about an inclination axis "AB" running between the areas of contact, "A" and "B" (FIG. 2), between the roller edges and the adjacent input and output races 22 and 26, respectively, so their spin axis "SA" moves from the above position of zero inclination through an angle of inclination to a position not intersecting the toric axis "TA." The rollers initially pivot only about the inclination axis, but the inclination generates forces at the areas or points of contact, "A" and "B," with the input and output races 22 and 26, respectively, which causes the rollers 32 to tilt perpendicularly to their planes of inclination or about a tilt axis in the plane of the contact perimeter perpendicular to the axis of inclination, moving the roller edges in opposite radial directions along the toric surfaces 95 and 96 formed on the driving and driven races 22 and 26, respectively, thereby changing the output/input speed ratio. As the rollers 32 tilt, they pull the carriers 64 and their associated extensions 72 along with them, causing the extended ends 72 to move along their respective slots 74 until the previously described angle of inclination has returned to zero. For each rotary position of the collar 76, there results a corresponding tilt angle for the rollers 32.

Whether the output/input speed ratio is increased or decreased, i.e., whether contact point "A" (FIG. 2) tilts inwardly toward the toric axis of the transmission input shaft 18 or radially outwardly therefrom, with point "B" tilting a corresponding distance in the opposite radial direction, depends upon whether the ratio collar 76 is rotated initially in a clockwise direction or a counterclockwise direction by the crankarm member 88 (FIG. 4). If the contacting edge "A" of the roller 32 moves radially inwardly along the toric surface 96 of the output race 26, and point "B" moves radially outwardly along the toric surface 95 of the input race 22, the resultant output/input speed ratio will be increased, whereas radially outward movement of the contacting edge "A" of the roller 32 along the surface 96 will produce a decreased output/input speed ratio. More specifically, when the input shaft 18 is driven clockwise as viewed from the input end and the output shaft is thus driven counterclockwise, inclination of the spin axis "SA" such that the point intersecting the toric axis at zero angle of inclination moves toward the viewer in FIG. 2, as a result of counterclockwise rotation of cam ring 76, causes input point "B" to move toward the toric axis "TA" to decrease the output/input speed ratio.

The amount and rate of tilt correction is proportional to the difference between the desired tilt position and the actual tilt position. The rate of tilt correction will be relatively large when the difference between the desired tilt position and the actual tilt position is relatively great and will automatically decrease as the rollers 32 approach the desired tilt position, due to the varying tractive forces generated at the rollers' edges resulting from the progressively varying inclination of the rollers 32.

Figure 6:
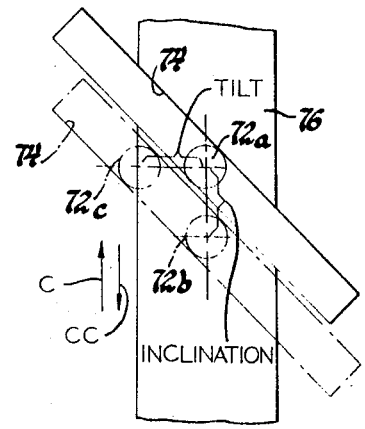
FIG. 6 is a diagrammatic view looking radially outwardly at the cam members showing operating characteristics of the invention.

Assume now a clockwise rotation of the driving race 22, a 45° cam groove angle and an initial 3° inclination angle of the carrier 64 and the extension 72. The ratio control collar 76 will have rotated about the axis of the input shaft 18 in a counterclockwise direction as viewed from the left in FIG. 5, by a predetermined movement of the crankarm member 88. The crankarm 88/control collar 76 pivotal relationship is illustrated in FIG. 5. The cam mechanism 72/74, as viewed from the inside of cam ring 76, is shown in FIG. 6 with the cam members 72, 74 in the solid line position in the zero angle of inclination and tilt position for constant 1:1 ratio drive. Movement of the ring 76 in the counterclockwise direction, indicated by arrow "cc," a distance, exaggerated for clarity, to the dotted position of cam 74 moves cam 74 and the end 72 from 72a, transverse to the toric axis through the angle of inclination, limited to 3°, to the dotted position 72b. Then the tracking action of the roller tilts the roller 32, and the cam 72 moves from position 72b to do Hed line position 72c, through the tilt angle, and simultaneously reducing the angle of inclination to zero. More specifically, the tractive forces generated on the contact areas "A" and "B" (FIG. 2), as a result of the inclination of the spin axis, will cause the right-hand edge "A" (FIG. 2) to move radially outwardly along the toric surfaces 96 and the left-hand contacting edge "B" radially inwardly along the toric surface 95. The latter movements continue until the extended end 72 in FIG. 5 has moved along the cam groove 74 until it once again arrives at the centerline, thereby removing all the inclination from the system. Disregarding any reactional pressure changes which would occur in an accompanying hydraulic system, resulting, of course, in a change in the inclination angle, it is apparent that the resultant tilt angle would also be 3°, in view of the 45° cam groove, producing the equal "inclination" and "tilt" distances illustrated in FIG. 6. Smaller initial angular inclinations would result in smaller final tilt angles for the rollers 32 because the distance required to return to a zero inclination angle along the 45° cam groove 74 would be shorter.

ERROR CORRECTION FEATURE

Figure 7:
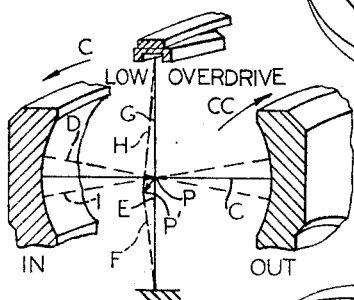
FIG. 7 is another diagrammatic view of a characteristic of the invention.

Referring now to FIG. 7, suppose two rollers are assembled so as to be positioned at the 1:1 ratio, represented by line "C," and one roller includes manufacturing tolerance errors which result in its being positioned, after assembly, toward a slightly higher output/input speed ratio, e.g., 1.01:1, such as along dotted line "D," Since the roller is trying to drive the output race faster than the other two rollers of the three-roller set, slight slippages occur at the roller-to-race contacts. This causes the out-of-ratio roller to carry more reaction torque than that shared by the other two. The rollers are mounted on reaction members, represented generally in FIG. 7 by "E," which have a predetermined torsional flexibility. This flexibility, represented by dotted line "F," permits inclinations in a forward or clockwise direction ($c$ in FIG. 6) in proportion to torque or increased load on the mast "E," similar to those resulting from the above-described rearward or counterclockwise actuation of the control collar, indicated by $cc$ in FIG. 6. The universal pivot point "P" will have moved to the position "P'." As a result, the rollers will slightly change ratio due to reaction torque. The extension "G" into the control collar is extended radially outwardly from the rollers so that the ratio change due to reaction torque along the dotted line "H" is an inclination of the type which produces tractive forces at the contacting edges of the roller which, in turn, automatically tilt the roller toward the "low" or toward a decreased speed ratio. As mentioned above, the roller positioned by errors toward increased speed ratio has larger reaction torques on its reaction members. As a result, its reaction members deflect more than those of the other two. Now, consider a situation wherein, due to a build up of tolerances, one roller of the three-roller set is positioned in a decreased output/input speed ratio, e.g., 99:1, as represented by the dotted line "I". In this case, the other two 1:1 ratio positioned rollers will tend to deflect or incline their masts E more, toward the dotted line F, thereby causing a tractive force at their contacting edges which tilts the rollers to reduce their speed ratio to match the out-of-ratio roller, the same as was explained above relative to a roller in position "D."

LUBRICATION SYSTEM

Referring now to FIG. 2, it is apparent that fluid under pressure from any suitable pump (not shown) may be directed via an inlet 98 into a chamber 100 formed in each hub 40 for the purpose of lubricating each roller assembly. The fluid is communicated from the chamber 100 to a central passage 102 formed in the mast 58, as well as through an axial groove 104 to a port 106 formed in the cylindrical member 44. The portion 106 supplies lubrication to the bearings 45. Fluid in the central passage 102 is communicated to a pair of angled passages 108 and 110 which are formed in the extension of the carrier 64 just outside the cam groove 74 such that these passages direct the fluid toward the toric surfaces 95 and 96 of the races 22 and 26, respectively, adjacent the upper side (FIG. 2) of each roller 32. An additional pair of angled passages 112 and 114 direct the fluid from the chamber 100 toward the surfaces 95 and 96 of the races 22 and 26, respectively, adjacent the underside (FIG. 2) of the roller 32.

It should be apparent that the friction roller assembly described above provides novel means for controlling the tilt angle of the roller member thereof, in response to a small inclination force, so as to produce a desired output/input speed ratio in an efficient manner, without the need for holding extremely close manufacturing tolerances, as well as providing an inherent self-compensating characteristic in the vent of tilt errors due to a build up of tolerances or any discrepancies therein.

While but one embodiment of the invention has been shown and described, other modifications thereof are possible.

I claim:

1. In a toric transmission including a housing; an input means; an output means, a toroidal power transmission mechanism comprising a friction roller assembly including first and second annular race members and a roller having a circular perimeter and a central axial opening formed therein, said roller being rotatably disposed between and with opposed portions of said circular perimeter in frictional contact with said first and second race members for rotation about a spin axis perpendicular to the plane of said circular perimeter at its center inclinating about an inclination axis in said plane through said opposed portions from a normal position in which the spin axis intersects the race axis and tilting about a tilting axis at right angles to said inclination axis and in said plane, a support member, one of said members being operatively connected to said input means, another of said members being operatively connected to said output means, and the third of said members being secured to said housing, said support member having a mast having a predetermined torsional flexibility and being rigidly supported by said support member and having pivot means at the free end thereof extending radially outwardly into and terminating at the center of said central axial opening, a carrier pivotably mounted on said pivot means at the intersection of said spin axis and said plane, located in said central axial opening and rotatably supporting said roller for rotation only about said spin axis, a ratio control collar concentrically located relative to said support member, a cam groove formed in said ratio control collar, a rigid extension formed on said carrier and extending radially outwardly therefrom into said cam groove, and means for moving said ratio control collar for inclining said extension, carrier and roller about said pivot means and along a transverse plane intermediate the planes of said first and second races, resulting in automatic tilting of said roller, carrier and extension along a plane perpendicular to said intermediate plane for variation of the drive ratio between said input and output means and in automatic reduction of said inclination to zero.

2. In a toric transmission; a housing; input means and output means rotatably mounted in said housing; a pair of annular toric race members coaxially mounted on a race axis with facing toric sides; a roller having a circular perimeter located between said race members with opposed portions of said circular perimeter in frictional contact with said facing toric sides of said race members being rotatable about a spin axis perpendicular to the plane of said circular perimeter at the center thereof and biasing said spin axis to a position intersecting said race axis, being inclinable about an axis of inclination through said opposed portions to move said spin axis away from said race axis, being tiltable to tilt said axis of inclination relative to said race axis, and having a central axial opening extending completely through said roller; carrier means in said opening having first universal pivot means opening to the side of said roller toward said spin axis and a rigid extension projecting radially outwardly from the opposite side thereof; bearing means between said carrier means and said roller to rotatably mount said roller on said carrier means for rotation only about said spin axis; a support member located on said one side of said roller having rigidly supported and torsionally flexible second universal pivot means extending radially outwardly therefrom and cooperating with said first universal pivot means for universally pivoting movement of said carrier means substantially at the intersection of said spin axis and said plane of said circular perimeter; movable cam means cooperating with said extension to move said spin axis away from said race axis to incline said roller to produce tractive forces to tilt said roller to change the ratio drive and automatically return said spin axis to said race axis to reduce said roller inclination to zero, one member being operatively connected to said input means; a second being operatively connected to said output means and a third being operatively connected to said housing.

3. In a toric transmission including a housing, a toroidal power transmission mechanism comprising a friction roller assembly including first and second annular race members and a roller having a central axial opening formed therein, said roller being rotatably disposed between and with opposed portions of the perimeter in frictional contact with said first and second race members, a central spider member, one of said members being operatively connected to an input means, another of said members being operatively connected to an output means, and the third of said members being secured to said housing, an outer annular ring, spoke means for securing said annular ring to said central spider member, a deflectable mast having one end thereof rigidly supported by said central spider member and a free end extending radially outwardly into and terminating at the center of said central axial opening, a carrier pivotably mounted on said free end and in said central axial opening such that said roller may rotate thereon, a ratio control collar concentrically located relative to said annular ring, a cam groove formed in said ratio control collar, an extension formed on said carrier and extending radially outwardly therefrom into said cam groove, and means for moving said ratio control collar for inclining said extension, carrier and roller about said free end and along a plane intermediate the planes of said first and second races, resulting in automatic tilting of said roller, carrier and extension along a plane perpendicular to said intermediate plane for variation of the drive ratio between said input and output means and in automatic reduction of said inclination to zero.

4. In a toric transmission including a housing, a toroidal power transmission mechanism comprising a friction roller assembly including first and second races and a roller having a central axial opening formed therein, said roller being rotatably disposed between and with opposed portions of the perimeter thereof in frictional contact with said first and second races, a central spider member, one of said first and second races and said central spider member being operatively connected to an input means, another of said first and second races and said central spider member being operatively connected to an output means, and the third of said first and second races and said central spider member being secured to said housing, an outer annular ring, spoke means for securing said outer annular ring to said central spider member, a substantially rigid mast having one end thereof supported by said central spider member and a free ball-shaped end extending radially outwardly into and terminating at the center of said central axial opening, a carrier pivotably mounted on said ball-shaped end and in said central axial opening such that said roller may rotate thereon, a ratio control collar concentrically located relative to said annular ring, a cam groove formed in said ratio control collar, an extension formed on said carrier and extending radially outwardly therefrom into said cam groove, said substantially rigid mast having a predetermined flexibility for flexing in response to any roller out-of-tolerance conditions, and means for moving said ratio control collar for inclining said extension, carrier and roller about said ball-shaped end and along a plane intermediate the planes of said first and second races and parallel thereto when said roller is in a 1:1 speed ratio position, resulting in automatic tilting of said roller, carrier and extension along a plane perpendicular to said intermediate plane for variation of the drive ratio between said input and output means and in automatic reduction of said inclination to zero.

5. In a toric transmission including a housing having a power input shaft and a power output shaft rotatably mounted therein, a toroidal variable-ratio power transmission mechanism comprising a friction roller assembly including a toroidal power input race secured to said power input shaft, a toroidal output race secured to said power output shaft, said input and output races being disposed coaxially with respect to one another, and a plurality of rollers rotatably disposed between said input and output races and frictionally engaging both of said races, a support member including an annular ring grounded to said housing at the outer periphery thereof and hub portion rotatably mounted on one of said shafts, a mast having one end supported by said hub portion and a first free end extending radially outwardly into and terminating at the center of each of said rollers, a carrier rotatably mounted on each of said first free ends and supporting said rollers, a ratio control collar concentrically located within said annular ring, a plurality of cam grooves formed in said ratio control collar, an extension including a second free end formed on each of said carriers and extending radially outwardly and terminating in one of said cam grooves such that a predetermined movement of said ratio control collar causes inclination of each of said carriers, rollers and extensions along a transverse plane intermediate the planes of said races, resulting in tilting of said carriers, rollers and extensions toward one of said races due to the tractive forces generated on the contacting edges of said roller and in automatically reducing the inclination to zero when the desired tilt angle is reached, said mast having resilient portions deflecting in response to changes in load resulting from any roller slippage due to tolerance variations.

6. In a toric transmission including a housing, a toroidal power transmission mechanism mounted in said said housing and comprising a friction roller assembly including a power input member, an output member and a reaction member secured to said housing, a first race connected to one member, a second race connected to a second member, and a plurality of rollers, support means having a rigidly mounted deflectable portion and universally pivotally mounting said rollers for universal movement and rotation in frictional engagement with said races, self-compensating means for urging any of said rollers having a higher output/input speed ratio than the others of said rollers toward a lower output/input speed ratio to compensate for roller slippage resulting from discrepancies due to tolerances, said self-compensating means including said deflectable portion of said support means deflecting due to changes in load caused by said slippage, and means for actuating said support means to incline said rollers along a plane intermediate the planes of said races an amount proportional to the desired angle of tilt, thereby generating tractive forces at the contacting edges of said rollers to automatically produce the desired tilt angle while reducing the inclination to zero.

7. The transmission mechanism described in claim 6, wherein said support means and said self-compensating means include a support member including an annular ring grounded to said housing at the outer periphery thereof and a rotatably mounted hub portion, a plurality of pin members each having one end secured to said hub portion and a free end extending radially outwardly terminating at the center of each of said rollers, a carrier spherically rotatably mounted on each of said free ends, bearing means around the outer peripheries of each of said carriers for rotatably supporting each of said rollers, cam means slidably mounted on said annular ring, and an extension formed on each of said carriers and extending radially outwardly into said cam means, each of said extensions and said respective pin members responding to any reaction torque thereon caused by any of said rollers which may be assembled in an output/input speed ratio position greater than that of any other of said rollers to urge said greater speed ratio roller toward a lower speed ratio position.

8. In a toric transmission including a housing, a toroidal power transmission mechanism mounted in said housing and comprising a friction roller assembly including a power input race, an output race, and a plurality of rollers, each of said rollers having a central axial opening formed therein, carrier means rotatably mounted in each of said central axial openings, universal pivot means formed in each of said carrier means, said rollers being rotatably disposed between and frictionally engaging said input and output races, fixed hub means intermediate said input and output races, deflectable means rigidly secured at one end thereof to said fixed hub means and extending directly radially outwardly therefrom into each of said universal pivot means in each of said carrier means in said central axial openings of each of said rollers for causing said rollers to cooperate to urge the roller having the highest output/input speed ratio toward a lower output/input speed ratio to compensate for roller slippage resulting from discrepancies due to tolerances.